United States Patent
Tanamoto et al.

(10) Patent No.: US 9,852,281 B2
(45) Date of Patent: Dec. 26, 2017

(54) AUTHENTICATION SYSTEM, AUTHENTICATION DEVICE, AND AUTHENTICATION METHOD

(71) Applicant: Kabushiki Kaisha Toshiba, Minato-ku (JP)

(72) Inventors: Tetsufumi Tanamoto, Kawasaki (JP); Takao Marukame, Chuo (JP); Shinichi Yasuda, Setagaya (JP); Yuichiro Mitani, Miura (JP); Shinobu Fujita, Inagi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/824,372

(22) Filed: Aug. 12, 2015

(65) Prior Publication Data

US 2016/0085961 A1 Mar. 24, 2016

(30) Foreign Application Priority Data

Sep. 19, 2014 (JP) ................. 2014-191009

(51) Int. Cl.
 *G06F 7/04* (2006.01)
 *G06F 21/44* (2013.01)
(52) U.S. Cl.
 CPC .................... *G06F 21/44* (2013.01)
(58) Field of Classification Search
 CPC ........................................... G06F 21/44
 USPC ........................................................ 726/19
 See application file for complete search history.

(56) References Cited

U.S. PATENT DOCUMENTS

| | | | |
|---|---|---|---|
| 6,760,472 B1 | 7/2004 | Takeda et al. | |
| 2005/0132189 A1* | 6/2005 | Katsube | G06F 21/31 713/168 |
| 2011/0043475 A1* | 2/2011 | Rigazio | G06F 3/04883 345/173 |
| 2012/0002045 A1 | 1/2012 | Tony et al. | |
| 2014/0214354 A1† | 7/2014 | Dreifus | |

(Continued)

FOREIGN PATENT DOCUMENTS

| | | |
|---|---|---|
| JP | 2000-235636 | 8/2000 |
| JP | 2006-268563 | 10/2006 |

(Continued)

OTHER PUBLICATIONS

Jorge Guajardo et al. "FPGA Intrinsic PUFs and Their Use for IP Protection", Cryptographic Hardware and Embedded Systems—CHES 2007, Lecture Notes in Computer Science, vol. 4727, 2007, 18 pages.

(Continued)

*Primary Examiner* — Teshome Hailu
(74) *Attorney, Agent, or Firm* — Oblon, McClelland, Maier & Neustadt, L.L.P.

(57) ABSTRACT

According to an embodiment, an authentication system includes a physical device, a calculator, and an authenticator. The physical device includes a data source which outputs a data sequence along time series. The calculator performs, using hidden Markov model, probability calculation on an ID which is based on the data sequence obtained from the physical device. The authenticator authenticates the physical device based on calculation result of the calculator.

9 Claims, 13 Drawing Sheets

(56) References Cited

U.S. PATENT DOCUMENTS

| | | |
|---|---|---|
| 2014/0293692 A1 | 10/2014 | Chen et al. |
| 2014/0327468 A1* | 11/2014 | Pfeiffer ............... H03K 19/003 326/8 |
| 2014/0372671 A1 | 12/2014 | Tanamoto et al. |

FOREIGN PATENT DOCUMENTS

| | | |
|---|---|---|
| JP | 2009-147088 A | 7/2009 |
| JP | 2009-527798 A | 7/2009 |
| JP | 2011-34382 | 2/2011 |
| JP | 2012-73954 | 4/2012 |
| JP | 2013-510381 A | 3/2013 |
| JP | 2014-523192 A | 9/2014 |
| JP | 2014-203467 | 10/2014 |
| JP | 2015-1761 | 1/2015 |
| JP | 2015-61201 A | 3/2015 |
| JP | 2015-127757 A | 7/2015 |
| WO | WO 2006/003711 A1 | 1/2006 |

OTHER PUBLICATIONS

Lawrence R. Rabiner "A Tutorial on Hidden Markov Models and Selected Applications in Speech Recognition", Proceedings of the IEEE, vol. 77, No. 2, Feb. 1989, 30 pages.

\* cited by examiner
† cited by third party

FIG.10

| bit0 | bit1 | bit2 | bit3 | bit4 | bit5 | bit6 | bit7 | bit8 | bit9 | bit10 | bit11 |
|---|---|---|---|---|---|---|---|---|---|---|---|
| 0 | 1 | 0 | 0 | 0 | 1 | 1 | 0 | 1 | 1 | 0 | 0 |
| 0 | 0 | 1 | 0 | 1 | 0 | 0 | 0 | 0 | 1 | 0 | 1 |
| 0 | 1 | 1 | 1 | 0 | 1 | 1 | 0 | 0 | 1 | 0 | 0 |
| 1 | 0 | 0 | 1 | 1 | 0 | 0 | 0 | 1 | 1 | 0 | 1 |
| 1 | 0 | 1 | 1 | 1 | 0 | 1 | 0 | 0 | 1 | 0 | 0 |
| 1 | 0 | 1 | 1 | 1 | 0 | 1 | 0 | 0 | 1 | 0 | 1 |
| 1 | 0 | 1 | 1 | 1 | 0 | 1 | 0 | 0 | 1 | 0 | 0 |
| 1 | 0 | 1 | 1 | 1 | 0 | 1 | 0 | 0 | 1 | 0 | 1 |
| 0 | 0 | 1 | 1 | 0 | 0 | 0 | 1 | 0 | 1 | 0 | 0 |
| 0 | 1 | 1 | 1 | 1 | 1 | 1 | 1 | 1 | 1 | 0 | 1 |
| 0 | 0 | 0 | 0 | 0 | 0 | 0 | 1 | 1 | 1 | 0 | 0 |
| 1 | 1 | 0 | 1 | 1 | 1 | 1 | 0 | 1 | 1 | 0 | 0 |
| 1 | 0 | 0 | 1 | 0 | 1 | 1 | 0 | 1 | 1 | 0 | 0 |
| 1 | 0 | 0 | 1 | 0 | 1 | 1 | 0 | 1 | 1 | 0 | 1 |
| 1 | 0 | 0 | 1 | 0 | 1 | 1 | 0 | 1 | 1 | 0 | 0 |
| 1 | 0 | 0 | 1 | 0 | 1 | 1 | 0 | 1 | 1 | 0 | 1 |
| 0 | 0 | 1 | 1 | 1 | 1 | 0 | 1 | 1 | 1 | 0 | 0 |
| 0 | 1 | 0 | 1 | 0 | 0 | 1 | 1 | 0 | 1 | 0 | 1 |
| 0 | 0 | 1 | 0 | 1 | 1 | 0 | 1 | 0 | 1 | 0 | 0 |
| 1 | 1 | 1 | 1 | 0 | 0 | 1 | 1 | 1 | 1 | 0 | 1 |
| 1 | 0 | 1 | 0 | 1 | 0 | 1 | 0 | 1 | 1 | 0 | 0 |
| 1 | 0 | 1 | 0 | 1 | 0 | 1 | 0 | 1 | 1 | 0 | 1 |
| 1 | 0 | 1 | 0 | 1 | 0 | 1 | 0 | 1 | 1 | 0 | 0 |
| 1 | 0 | 1 | 0 | 1 | 0 | 1 | 0 | 1 | 1 | 0 | 1 |
| 0 | 0 | 1 | 0 | 0 | 0 | 0 | 1 | 1 | 1 | 0 | 0 |
| 0 | 1 | 1 | 0 | 1 | 1 | 1 | 1 | 0 | 1 | 0 | 1 |
| 0 | 0 | 0 | 1 | 0 | 0 | 0 | 1 | 0 | 1 | 0 | 0 |
| 1 | 1 | 0 | 1 | 1 | 1 | 1 | 1 | 1 | 1 | 0 | 1 |
| 1 | 0 | 0 | 1 | 0 | 1 | 1 | 0 | 1 | 1 | 0 | 0 |
| 1 | 0 | 0 | 1 | 0 | 1 | 1 | 0 | 1 | 1 | 0 | 1 |
| 1 | 0 | 0 | 1 | 0 | 1 | 1 | 0 | 1 | 1 | 0 | 0 |

ACTUALLY-MEASURED DATA | INTENTIONALLY-CREATED DATA

AUTHENTICATION SYSTEM, AUTHENTICATION DEVICE, AND AUTHENTICATION METHOD

CROSS-REFERENCE TO RELATED APPLICATIONS

This application is based upon and claims the benefit of priority from Japanese Patent Application No. 2014-191009, filed on Sep. 19, 2014; the entire contents of which are incorporated herein by reference.

FIELD

An embodiment described herein relates generally to an authentication system, an authentication device, and an authentication method.

BACKGROUND

In recent years, with the enhancement achieved in the communication speed and the progress made in cloud computing, there has been a sudden expansion in the use of near field communication (NFC). Typically, the NEC is implemented in IC cards such as cash cards or credit cards; in the electronic money facility provided in smartphones; and in smart cards used as bus tickets or railway tickets. In the NFC, the issue has been to strengthen the security in regard to the ID identification function that enables identification of individual persons.

Besides, in recent years, even the memory cards that were typically used only to store personal data are also increasingly being equipped with the ID identification function. That has led to the technical issue of providing sophisticated ID identification function in portable devices.

With that background, research and development has been going on about using the variability in each individual device as the "chip fingerprint". Such technology is known as a physically unclonable function (PUF).

From among the types of PUF, the PUF that is most researched at present is SEAM-PUP (SRAM stands for static random access memory). The SRAM-PUF represents the technology for using the variability that exists while manufacturing two inverters constituting an SRAM. Particularly, the RAM-PUF[1-3] that is most popular is implemented in the security IP and IC cards mentioned above. Moreover, as a proposal for using the initial variability of an electronic device, the application of PUF to a nonvolatile memory is also being studied.

BRIEF DESCRIPTION OF THE DRAWINGS

FIG. 10 is a diagram illustrating sample data that is used for the evaluation according to the embodiment;

DETAILED DESCRIPTION

According to an embodiment, an authentication system includes a physical device, a calculator, and an authenticator. The physical device includes a data source which outputs, along time series, digital data in synchronization with a reference signal. The calculator performs, using hidden Markov model, probability calculation on an ID which is based on a data sequence obtained from the physical device. The authenticator authenticates the physical device based on calculation result of the calculator.

An exemplary embodiment of an authentication system, an authentication device, and an authentication method is described below in detail with reference to the accompanying drawings. The authentication system, the authentication device, and the authentication method according to the embodiment are related to security identification of semiconductor products in which an ID authentication method using the hidden Markov model (HMM) is implemented. However, that is not the only possible case. That is, the following explanation is applicable to various authentication systems, authentication devices, and authentication methods related to the disclosure given herein.

In one of the types of PUF, a random number source is used (hereinafter, such a PUF is called a random number PUF). The random number PUF has the advantage of being able to use a random number source, such as a random number generating circuit, without modification. Moreover, since the output data of a random number generating circuit represents temporally-continuous data, the random number PUP possesses the characteristic of having correlation among pieces of data.

If a PUF is combined with a Fuzzy Extractor (FE) that is capable stably extracting information from the data including noise, it becomes possible to generate a device-specific key that is difficult to duplicate. A statistical method such as using an FE is excellent in identification of pieces of data not having temporal correlation among bits unlike the spatial bit sequence of an SRAM. However, it is not always efficient to implement such a method without modification on the time-oriented bit sequence generated by a random number PUF. That is because of the fact that each piece of data is affected by the earlier pieces of data.

Figure 1:
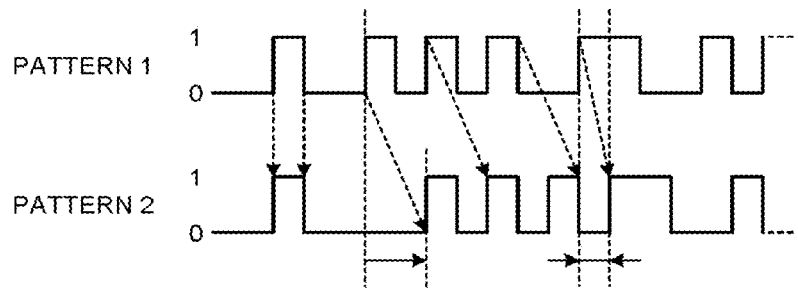
FIG. 1 is a diagram illustrating an example in which there occurs a shift in the pattern output from the same device.

That is, in a random number PU, the generation of pieces of data is not mutually independent events. For example, as illustrated in FIG. 1, in a random number PUF, there can be pieces of data in which e same pattern is repeated with the shift of one or two bits. However, if analysis is performed only regarding the average and the dispersion of "0" and "1", then there is a possibility of not being able to identify the fact that such two patterns are output from the same device.

In this way, in the case of treating the pieces of data having correlation, it is not for sure that accurate authentication is possible using the regular statistical processing performed in an SRAM-PUF. In the embodiment described below, an authentication system, an authentication device, and an authentication method are provided that are effective also in the case in which there is correlation among the pieces of data.

Regarding the method of performing fingerprint authentication of the pieces of data that are not independent events, it is possible to think of voiceprint authentication as the authentication being effective and having a high authentication probability. However, as compared to the volume of data in voice recognition, the volume of data of time-series data generated by a random number PUP is only about 100 bits to 1000 bits. Hence, the authentication method using voice authentication is difficult to implement without modification. In that regard, in the embodiment, with the aim of enabling implementation of the authentication method using voice recognition on a small number of bits too, a method is proposed in which inter-bit error correction is also used in combination.

In inter-bit error correction, it is possible to use, for example, the hidden Markov model (HMM), which is one of the stochastic/statistical models created for the purpose of processing complex and incomplete information obtained from the real world. The HMM is widely used in neural network models, voice recognition, and image processing. Moreover, the HMM is one of the expectation-maximization (EM) algorithms and represents a statistical method for estimating the parameters of a probability model based on the maximum-likelihood approach.

In the EM algorithm, the calculation is done by repeating an expected-value step and a maximization step using the iteration method. The parameters decided in the maximization step are used in deciding the distribution of latent variables to be used in the next expected-value step.

Figure 2:
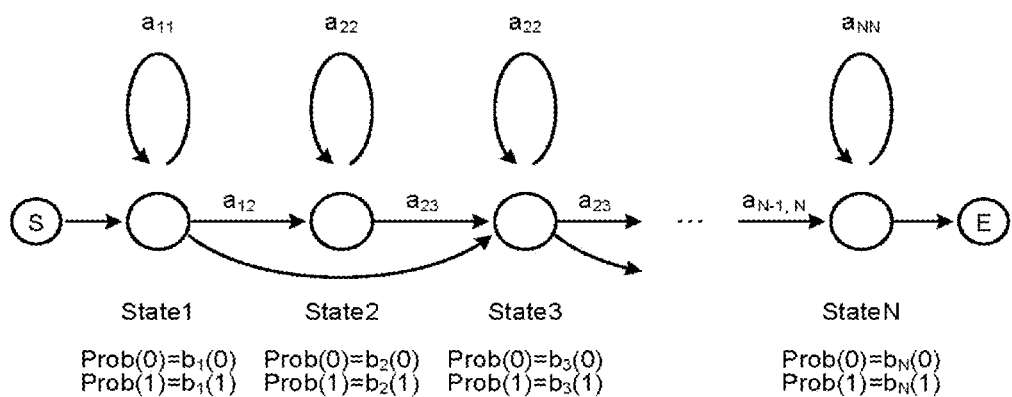
FIG. 2 is a diagram illustrating an example of parameters of the hidden Markov model (HMM)
Figure 3:
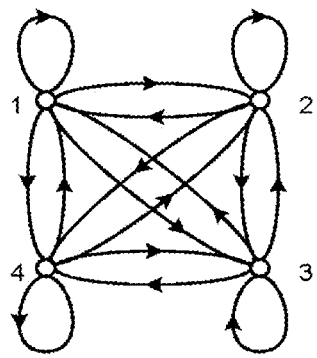
FIG. 3 is a diagram illustrating an example of state transitions in the HMM.

The Markov model has two types of probability parameters, namely, a state and an inter-state transition probability. For example, as illustrated in FIGS. 2 and 3, the next state is stochastically decided depending on the previous state. In the simple Markov model, internal states and observation values correspond to each other on a one-to-one basis. In contrast, in the hidden Markov model, each internal state can stochastically take a plurality of observation values. For that reason, the hidden Markov model has a higher degree of freedom for writing a phenomenon, and thus can be applied over a broader scope.

Figure 4:
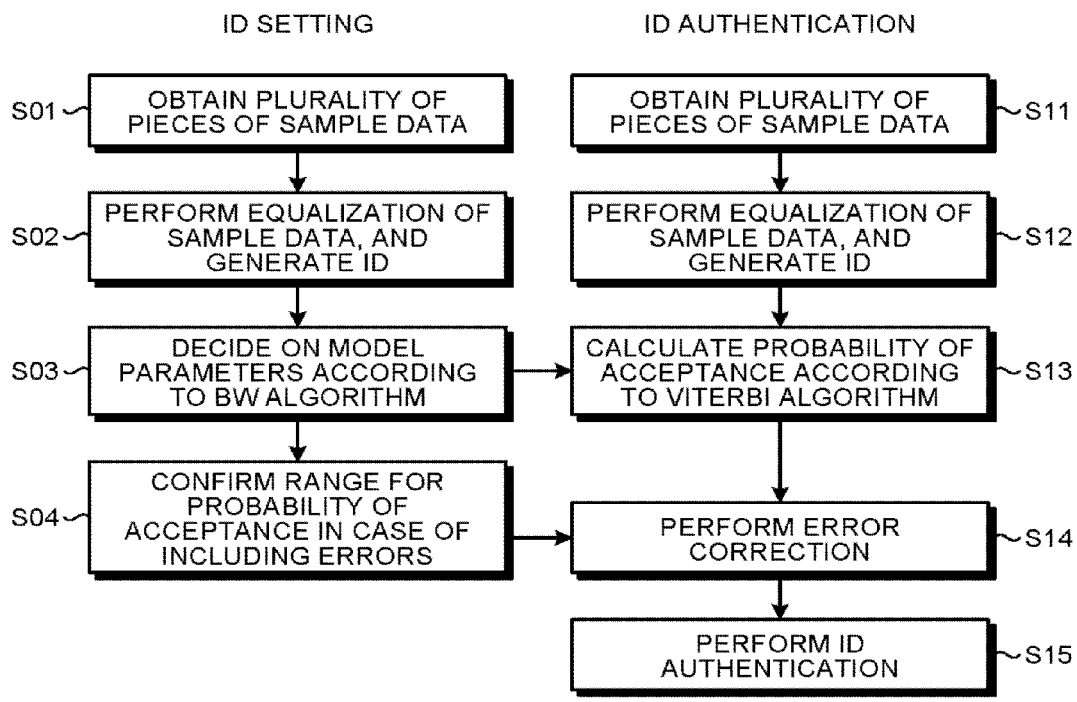
FIG. 4 is a flowchart for explaining an example of the authentication method using the HMM according to an embodiment.

FIG. 4 is a flowchart for explaining an example of the authentication method using the HMM according to the embodiment. With reference to FIG. 4, Steps S01 to S04 represent a sequence of operations performed for the purpose of ID setting, and Steps S11 to S15 represent a sequence of operations performed for the purpose of ID authentication. Herein, Steps S03 and S13 can be same as the steps used in regular voice authentication. Since the volume of data used in voice recognition is large, it is possible to perform authentication at Steps S11 to S13. However, regarding the authentication performed using a PUF; there are times when a communication line is used, and the volume of data is small in the range of about 100 bits to 1000 bits. Hence, it is desirable to perform error correction at Step S14.

In the ID setting, firstly, measurement is repeatedly performed twice or more times in the initial stage, and a plurality of pieces of sample data (also called PUF data or fingerprint data) is obtained from the target device (Step S01). Herein, the initial stage may represent the stage of activating the target device when the transistors in the device are still unstable. Then, the obtained sample data is subjected to equalization to generate a bit sequence (hereinafter, called an ID) that is unique to the target device (Step S02). Herein, equalization of the sample data can be performed using, for example, averaging. The resultant ID represents a bit sequence having a combination of "0" and "1".

Alternatively, in the ID setting, a histogram of the sample data can be obtained and the data pattern having the highest frequency in the histogram can be set as the ID. When there is a plurality of data patterns having a high frequency, each data pattern can be registered as an ID. In the following explanation, the term "equalization" is used to represent all such cases.

Subsequently, the Baum-Welch (BW) algorithm is implemented to decide on the model parameters (the state transition probability and the distribution probability in each state) of the Markov model used to write the IDs (Step S03). As a result, unique parameters are set for each ID.

Then, assuming a case in which the ID (the bit sequence) obtained from the target device is shifted, a range is confirmed in which it is possible to obtain the probability of acceptance of the maximum-likelihood path in the Markov model (Step S04). For example, at Step S04, some errors are actually incorporated in the ID, and the Viterbi algorithm is implemented to calculate the probability of acceptance of the maximum-likelihood path. That enables confirmation of the range (for example, the lower limit) of the probability of appearance in the case of including errors.

The ID generated in the manner described above, the model parameters of the ID, and the range for the probability of acceptance in the case of including errors are stored and managed, for example, in the memory of a server (not illustrated).

In the ID authentication, in an identical manner to Steps S01 and S02, a plurality of pieces of sample data is obtained from the target device (Step S11) and Is subjected to equalization to generate an ID unique to the target device (Step S12). In this way, in the ID authentication too, instead of using a single piece of data, a plurality of pieces of sample data is obtained by performing the measurement twice or more times, and equalization of the sample data is performed so as obtain the ID of the target device.

Then, it is determined whether or not the generated ID fits in the Markov model. More particularly, using the Viterbi algorithm, the probability of acceptance of the maximum-likelihood path is calculated from among various paths between the states in the Markov model (Step S13). If the probability of acceptance of the maximum-likelihood path is equal to or greater than a predetermined probability of acceptance, it is possible to determine at this stage that the authentication is successful.

Subsequently, error correction is performed on the ID ng the Bose-Chanduri-Hocquenguem (BCH) code or the Reed-Solomon code (Step S14). Then, based on whether or not the probability of acceptance of the maximum-likelihood path of the post-error-correction ID is within the range for the probability of acceptance confirmed at Step S04 (for example, the range equal to or greater than the confirmed lower limit), it is decided whether or not to perform the final authentication (Step S15).

In this way, in the ID setting according to the embodiment, (1) the sample data is subjected to statistical processing and equalization so as to decide on the device-specific ID (the bit sequence) and (2) the Pb algorithm is implemented to set the parameters (random components) of the hidden Markov Model from the decided ID. Moreover, (3) assuming the case of including errors, the range for the probability of acceptance of the maximum-likelihood path in the Markov model is also confirmed in advance. In the ID authentication, (1) the Viterbi algorithm is implemented to apply the obtained ID (the bit sequence) to the hidden Markov model and the probability of acceptance of the maximum-likelihood path is obtained and (2) device authentication is performed based on whether or not the obtained probability of acceptance satisfies certain conditions. Moreover, (3) when the obtained ID (the hit sequence) includes errors, error correction is performed and it is decided whether or not to perform the final authentication.

Meanwhile, in the embodiment, while performing the ID setting as well as the ID authentication, error correction and data correction performed. Herein, assuming that errors may occur during the ID authentication is different from voice recognition. Moreover, in the embodiment, the HMM algorithm is used for the ID setting and the ID authentication. The calculation using the HMM algorithm can be performed by a server on a network.

Figure 5:
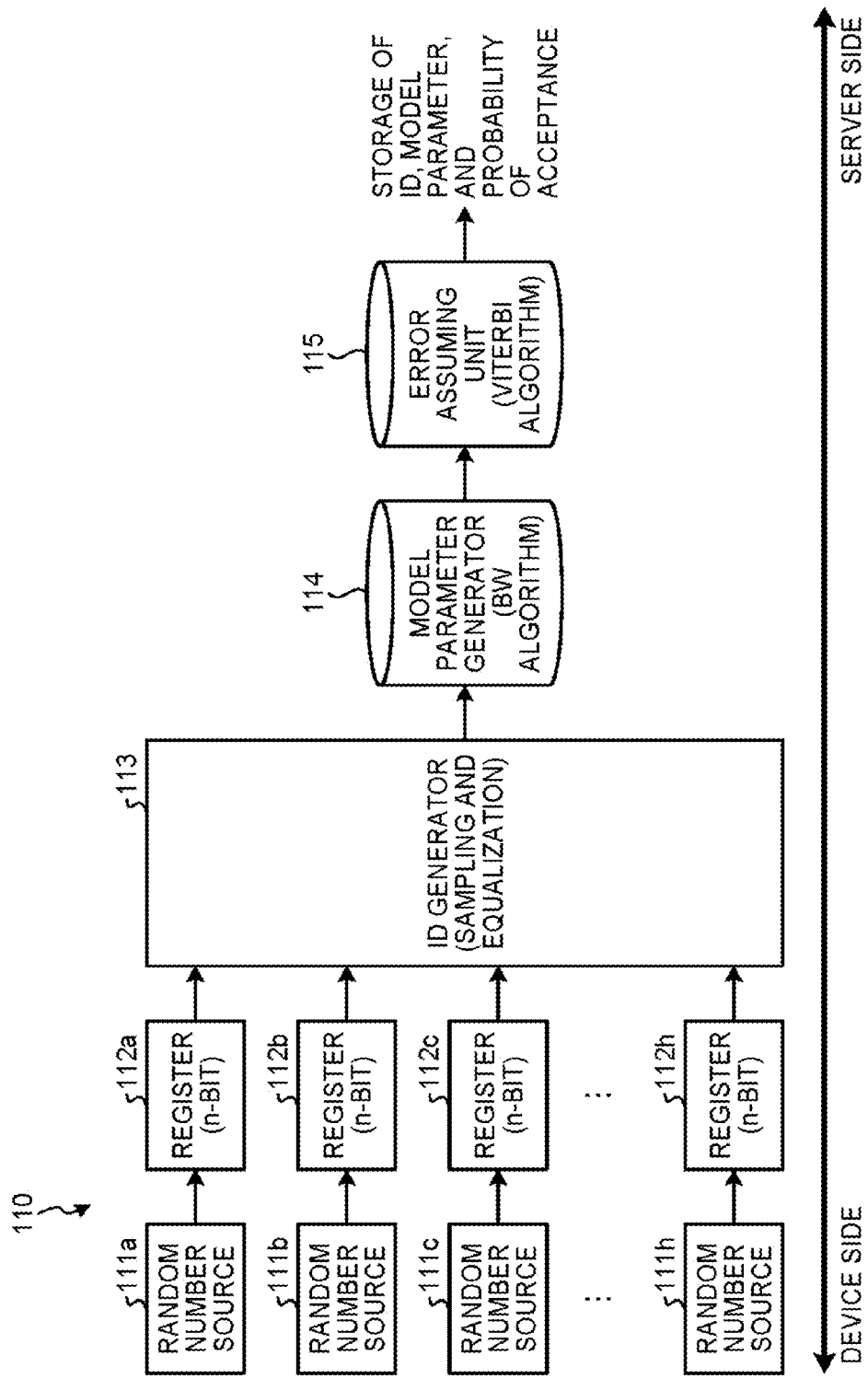
FIG. 5 is a block diagram illustrating an exemplary overall configuration of an ID setting mechanism in an authentication system according to the embodiment.

FIG. 5 is a block diagram illustrating an exemplary overall configuration of an ID setting mechanism in the authentication system according to the embodiment. As illustrated in FIG. 5, an ID setting mechanism 110 includes a plurality of random number sources 111a to 111h; a plurality of registers 112a to 112h corresponding to the random number sources 111a to 111h, respectively; an ID generator 113; a model parameter generator 114; and an error assuming unit 115. In the following explanation, when the random number sources 111a to 111h need not be distinguished from each other, they are referred to as random number sources 111. Likewise, when the registers 112a to 112h need not be distinguished from each other, they are referred to as registers 112. The random number sources 111 are installed in a target device for authentication; and output, along time series, digital data of "0" and "1" in synchronization with a reference signal. In FIG. 5, an example is illustrated in which eight random number sources 111 are included. However, the number of random number sources is not limited to eight. Moreover, with reference to FIG. 5, the constituent elements disposed on the device side are installed in the target device for authentication, while the constituent elements disposed on the server side are installed in a server that performs device authentication. The position for separating the device side and the server side can be varied in an appropriate manner. For example, the random number sources 111 and the registers 112 can be disposed on the device side. Alternatively, the random number sources 111, the registers 112, and the ID generator 113 can be disposed on the device side. Moreover, the server side can have only a single server, or can represent a cloud having a plurality of computers.

Figure 6:
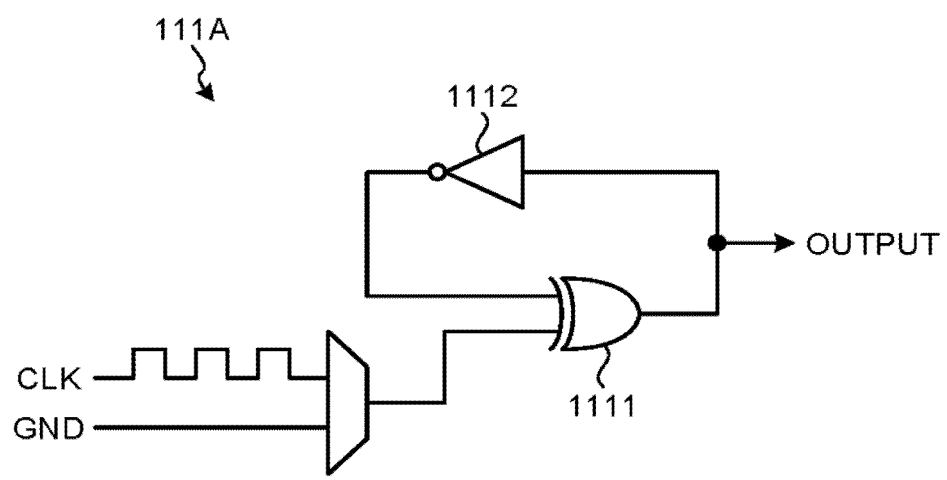
FIG. 6 is a circuit diagram illustrating an example of a random number generation circuit according to the embodiment.
Figure 7:
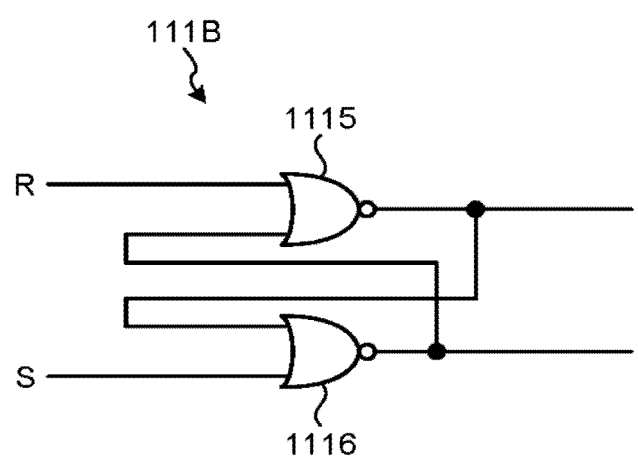
FIG. 7 is a circuit diagram illustrating another example of a random number generation circuit according to the embodiment.

With reference to FIG. 5, the random number sources 111 can be, for example, random number generating circuits. FIGS. 6 and 7 illustrate exemplary random number generating circuits. As illustrated in FIG. 6, a random number generating circuit 111A includes an exclusive OR circuit 1111 and an inverter 1112. As illustrated in FIG. 7, a random number generating circuit 111B includes two negative OR circuits 1115 and 1116.

Each of the exclusive OR circuit 1111, the inverter 1112, and the negative OR circuits 1115 and 1116 includes a transistor. While a transistor is performing operations in an unstable manner immediately after being activated, a stable signal according to a clock signal (CLK) is not output, and an unstable signal is output. Since the unstable signal possesses the device-specific pattern, it is possible to use the unstable signal as the device-specific ID. However, in the embodiment, the random number sources are not limited to the random number generating circuits 111A and 111B that output data having time-oriented correlation. That is, as long as a random number source outputs device-specific sample data, it serves the purpose. For example, as long as a random number source has the entropy equal to or smaller than 0.5 for each bit of the output digital data, various modifications of random number source are possible. For example, it is possible to use a random number generating circuit that includes a ring oscillator that outputs oscillation signals and a flip-flop circuit that latches the output of the ring oscillator.

Returning to the explanation with reference to FIG. 5, the sample data (for example, an n-bit bit sequence) generated by each random number generating circuit 111 is temporarily stored in the corresponding register 112 before being output to the ID generator 113. Each register 112 can be configured using, for example, a static random access memory (SRAM).

The ID generator 113 performs operations equivalent to the operations performed at Steps S01 and S02 illustrated in FIG. 4. More particularly, the ID generator 113 obtains the pieces of sample data that is temporarily stored in the registers 112, and generates the device-specific ID by obtaining the average value of the pieces of sample data.

Alternatively, the ID generator 113 can mix the pieces of sample data, which are generated by some random number generating circuits 111, using an exclusive OR (XOR) gate and a bit shifting circuit; and can set the obtained value as the device-specific ID. As a result of mixing the data, it becomes possible to enhance the robustness against the changes in the external environment such as temperature. For example, if the sample data generated by each random number generating circuit 111 changes in the same manner with respect to the changes in the external environment, then mixing of the data enables achieving reduction or elimination of the effect of the external changes.

The model parameter generator 114 performs the operation equivalent to the operation performed at Step S03 illustrated in FIG. 4. More particularly, the model parameter generator 114 implements the BW algorithm and decides on the model parameters (the state transition probability and the distribution probability in each state) of the Markov model from the ID generated by the ID generator 113.

The error assuming unit 115 performs the operation equivalent to the operation performed at Step S04 illustrated in FIG. 4. More particularly, for example, the error assuming unit 115 actually incorporates some errors in the ID generated by the ID generator 113, and implements the Viterbi algorithm to calculate the probability of acceptance of the maximum-likelihood path in the Markov model. With that, the error assuming unit 115 confirms the range (for example, the lower limit) for the probability of acceptance in the case of including errors.

The ID, the model parameters, and the probability of acceptance in the case of including errors generated in this manner are stored, for example, in a memory unit (not illustrated) of the ID setting mechanism 110.

Figure 8:
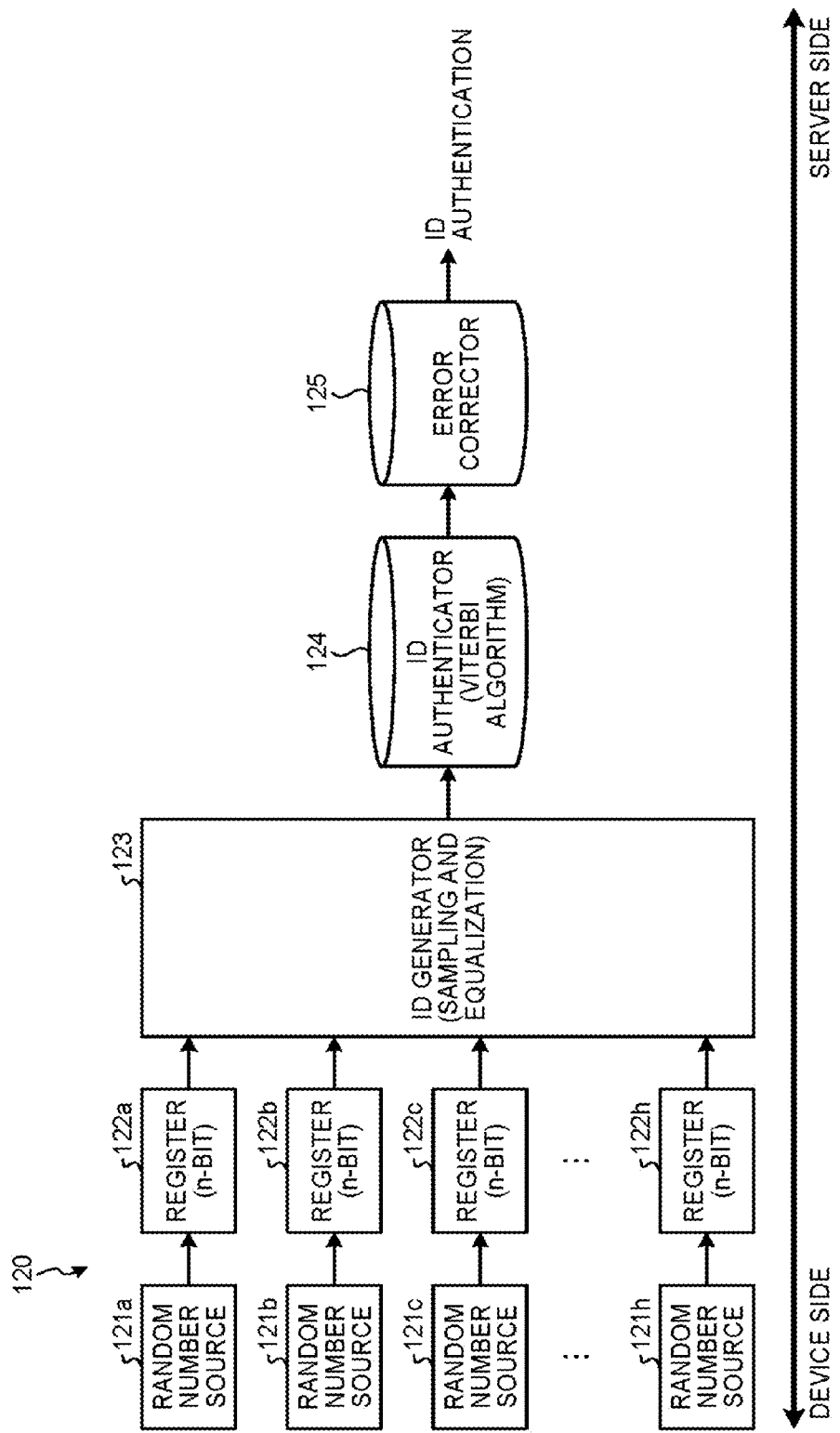
FIG. 8 is a block diagram illustrating an exemplary overall configuration of an ID authentication mechanism in the authentication system according to the embodiment.

FIG. 8 is a block diagram illustrating an exemplary overall configuration of an ID authentication mechanism in the authentication system according to the embodiment. As compared to the ID setting mechanism illustrated in FIG. 5 in which ID processing is performed using the BW algorithm, an ID authentication mechanism 120 illustrated in FIG. 8 mainly differs in the way that ID processing is performed using the Viterbi algorithm.

As illustrated in FIG. 8, the ID authentication mechanism 120 includes a plurality of random number sources 121*a* to 121*h*; a plurality of registers 122*a* to 122*h* corresponding to the random number sources 121*a* to 121*h*, respectively; an ID generator 123; an ID authenticator 124, and an error corrector 125. In the following explanation, when the random number sources 121*a* to 121*h* need not be distinguished from each other, they are referred to as random number sources 121. Likewise, when the registers 122*a* to 122*h* need not be distinguished from each other, they are referred to as registers 122. The random number sources the registers 122, and the ID generator 123 can be respectively identical to, for example, the random number sources 111, the registers 112, and the ID generator 113 illustrated in FIG. 5. Moreover, in an identical manner to FIG. 5, with reference to FIG. 8, the constituent elements disposed on the device side are installed in the target device for authentication, while the constituent elements disposed on the server side are installed in a server that performs device authentication. The position for separating the device side and the server side can be changed in an appropriate manner. For example, the random number sources 121 and the registers 122 can be disposed on the device side. Alternatively, the random number sources 121, the registers 122, and the ID generator 123 can be disposed on the device side. Moreover, the server side can have only a single server, or can represent a cloud having a plurality of computers.

The ID generator 123 performs operations equivalent to the operations performed at Steps S11 and S12 illustrated in FIG. 4. More particularly, the ID generator 123 obtains the pieces of sample data that is temporarily stored in the registers 122, and generates the device-specific ID by obtaining the average value of the pieces of sample data.

The ID authenticator 124 performs the operation equivalent to the operation performed at Step 313 illustrated in FIG. 4. More particularly, the ID authenticator 124 implements the Viterbi algorithm to calculate the probability of acceptance of maximum-likelihood path of the ID generated by the ID generator 123. If the probability of acceptance of the maximum-likelihood path is equal to or greater than a predetermined probability of acceptance, the ID authenticator 124 can determine that the authentication is successful.

The error corrector 125 performs the operations equivalent to the operations performed at Steps S14 and 315 illustrated in FIG. 4. More particularly, the error corrector 125 performs error correction on the ID using the BCH code or the Reed-Solomon code and, based on whether or not the probability of acceptance of the maximum-likelihood path of the post-error-correction ID is within the range for the probability of acceptance as registered in the server (for example, the range equal to or greater than the confirmed lower limit), determines whether or not to perform the final authentication.

Figure 9:
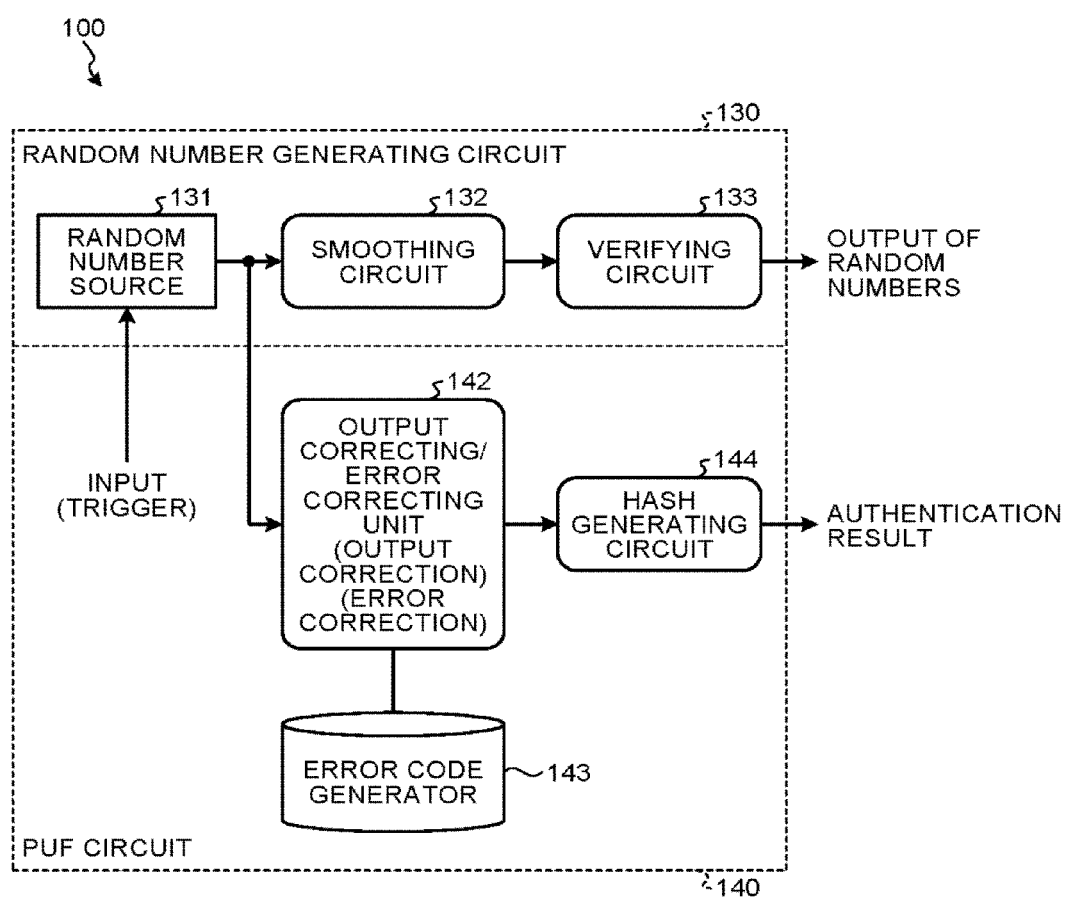
FIG. 9 is a block diagram illustrating an exemplary overall configuration of the authentication system according to the embodiment.

FIG. 9 is a block diagram illustrating an exemplary overall configuration of the authentication system according to the embodiment. An authentication system 100 illustrated in FIG. 9 is configured by combining a random number generating circuit. 130 and a PUF unit 140.

The random number generating circuit 130 includes a random number source 131, a smoothing circuit 132, and a verifying circuit 133. The random number source 131 is, for example, a ring oscillator including an odd number of inverters. However, alternatively, any other type of random number source that is capable of generating random numbers can be used as the random number source 131. The smoothing circuit 132 performs averaging of the bit patterns of "0" and "1". Meanwhile, the smoothing circuit 132 may be omitted. However, in case there is variability in the data at the time of activating the random number source 131, it desirable that the smoothing circuit 132 is disposed. The verifying circuit 133 performs degree verification in which, for example, the frequencies of appearance of the random numbers are subjected to chi-square verification, and outputs the random numbers.

The PUF unit 140 is an example of a generator. The PUS unit 140 includes an output correcting/error corrector 142 that performs HMM correction on the random numbers generated by the random number source 131, and performs output by appending an error correction code sent by an error code generator 143. Moreover, the PUF unit 140 includes a hash generating circuit 144 that generates a cryptographic key by adding a hash function to the output of the output correcting/error corrector 142, and outputs the cryptographic key.

Meanwhile, with reference to FIG. 9, the data obtained by mixing the random numbers generated by the random number source 131 can be input to the PUF unit 140. That is done because, in the case of using a standalone random number source as illustrated in FIG. 6 or FIG. 7, the ID undergoes changes accompanying the changes occurring in the external environment such as temperature. In that regard, in an identical manner to the ID generator 113 illustrated in FIG. 5, the random number source illustrated in FIG. 6 or FIG. 7 can be used in plurality and the data generated by those random number sources can be mixed using an XOR gate or a bit shifting circuit. As a result, it becomes possible to generate an ID that is highly robust against the changes in the external environment.

Meanwhile, it is desirable that the ID authentication using the HMM is performed on the server side having a relatively higher capacity. However, when there is some margin in the capacity on the device side, the ID authentication using the HMM can alternatively be performed using a coprocessor installed on the device side.

Explained below in detail with reference to the accompanying drawings is an evaluation example of the sample data that is actually generated. FIG. 10 is a diagram illustrating sample data that is used for the evaluation according to the embodiment. FIG. 10 illustrates nine patterns of data (bit0 to bit8), which are actually measured by performing an experiment, and three patterns of data (bit9 to bit11), which are intentionally created. During the evaluation, the abovementioned algorithms are implemented for each piece of sample data, and authentication of the sample data is done. Moreover, in order to obtain the actual data, a random number source is used that includes a mechanism by which "0" and "1" vary in the metastable state. For example, the random number generating circuit 111A illustrated in FIG. 6 or the random number generating circuit 111B illustrated in FIG. 7 is used.

However, the output from a random number source is complex due to the effect of external noise. Hence, it is a difficult task to theoretically derive which and how many internal states should be used as the HMM. In that regard, by focusing the attention on the fact that the number of states is an important factor in the HMM, it is considered to use several states. Moreover, as the model, it is assumed that a left-right model illustrated in FIG. 2 is used.

In the left-right model, it is assumed that the transition of states occurs in the direction in which the time proceeds. Each state is some kind of an electronic state of the internal circuit in the random number source.

However, there is no need to identify the specific types of states. Moreover, a bit count T of the sample data used in the authentication is assumed to be 32 bits (T=32). In that case, by taking into account the self-loop, the number N of states becomes smaller than the bit count T. Thus, explained below is an example of evaluating the sample data using three models in which the number N of states is equal to three, five, and 10.

During the authentication, firstly, the model parameters of the HMM that are determined based on the BW algorithm are used and then, for the purpose of confirmation, the probability of the most suitable path at the same ID is calculated based on the Viterbi algorithm. The BW algorithm is repeatedly implemented 30 times. The result that is obtained is illustrated in FIG. 11 (in the case of N=3), FIG. 12 (in the case of N=5), and FIG. 13 (in the case of N=10).

Figure 11:
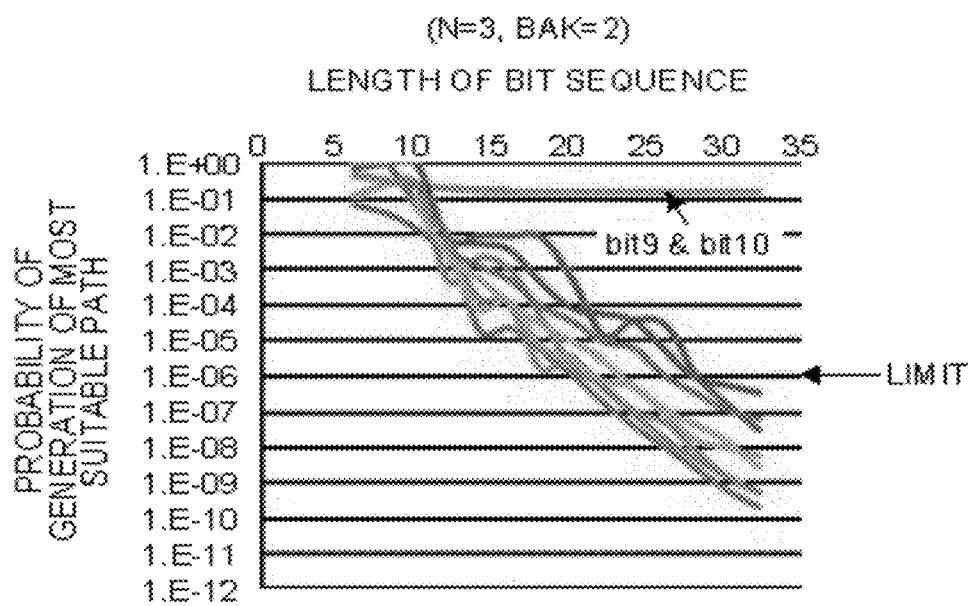
FIG. 11 is a diagram illustrating an evaluation result of the sample data illustrated in FIG. 10 (in the case of N=3)
Figure 12:
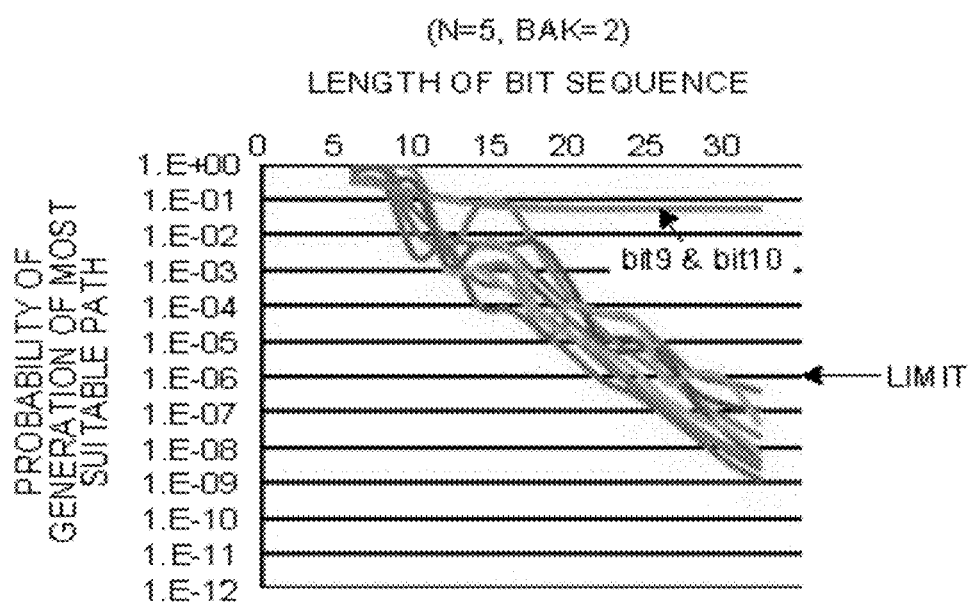
FIG. 12 is a diagram illustrating an evaluation result of the sample data illustrated in FIG. 10 (in the case of N=5)
Figure 13:
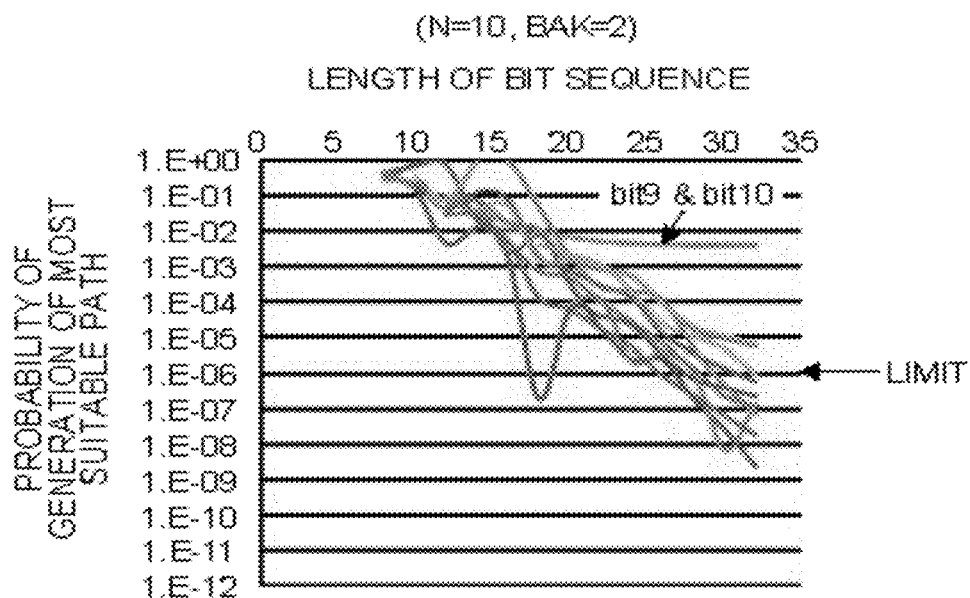
FIG. 13 is a diagram illustrating an evaluation result of the sample data illustrated in FIG. 10 (in the case of N=0.10)

As illustrated in FIGS. 11 to 13, regardless of the input of the same ID as u ID that is input at the time of obtaining the coefficients for the BW algorithm, the probability of generation of the most suitable path does not become equal to 1. Rather, as the bit sequences go on increasing, the probability goes on decreasing in an exponential fashion. It implies that, as the bit sequences go on increasing, the probability of taking various paths goes on increasing. In each of FIGS. 11 to 13, the data having a particularly high probability are bit9 and bit10 used as fixed patterns in FIG. 10. If the calculation is performed using "float" of the normal C language, the probability of generation of the most suitable path has the limit of 10E-6. Meanwhile, with reference to FIGS. 11 to 13, since all calculations are performed using "double" variable, the calculation is performed up to 12 digits after the decimal point.

As can be seen from FIGS. 11 to 13, when the bit sequence to be tested has the length exceeding 20 bits, even if the IDs exactly match with each other, the probability of generation of the most suitable path may be equal to or smaller than 10E-6. Hence, it is not effective as authentication.

Figure 14:
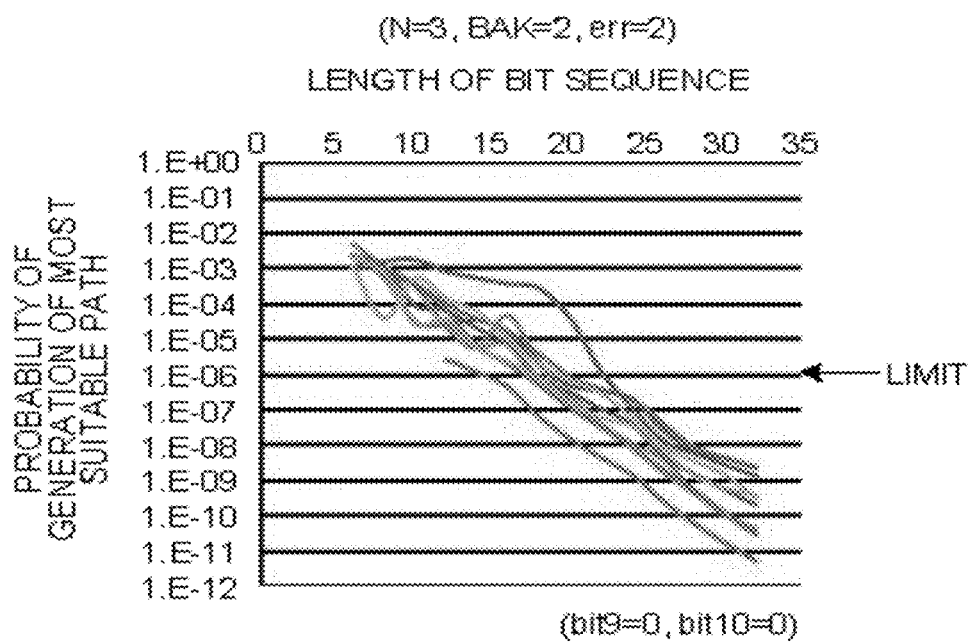
FIG. 14 is a diagram illustrating an evaluation result in a case in which the sample data illustrated in FIG. 10 includes a two-bit error (in the case of N=3)
Figure 15:
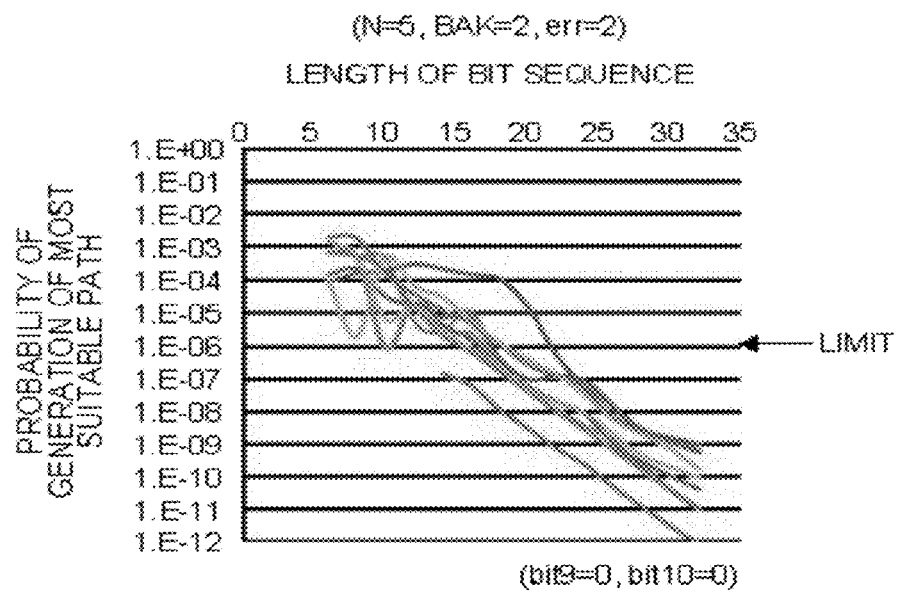
FIG. 15 is a diagram illustrating an evaluation result in a case in which the sample data illustrated in FIG. 10 includes a two-bit error (in the case of N=5)
Figure 16:
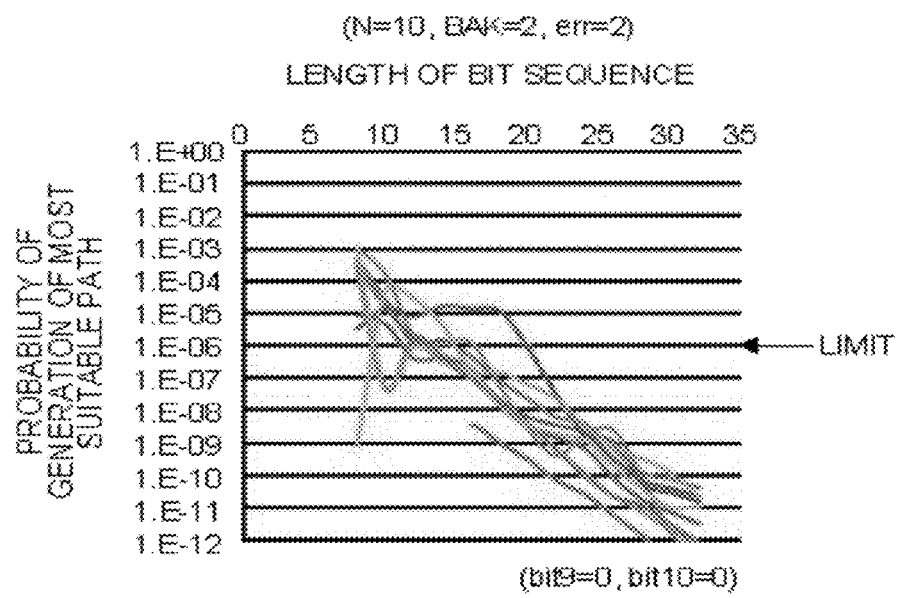
FIG. 16 is a diagram illustrating an evaluation result in a case in which the sample data illustrated in FIG. 10 includes a two-bit error (in the case of N=10)

Explained below is the case in which the data obtained by inverting only two bits from the correct ID is input to the Viterbi algorithm and the probability of generation of the most suitable path is calculated. The result that is obtained is illustrated in FIG. 14 (in the case of N=3), FIG. 15 (in the case of N=5), and FIG. 16 (in the case of N=10). If FIGS. 14 to 16 are compared, it can be seen that the probability of generation decreases as the number N of states is increased. Particularly, regarding bit9 and bit10 that always have the same value, the probability of generation is zero. It implies that the data is extremely "fragile" with respect to bit errors. Moreover, when the number N of states is equal to three and the number of bit sequences is 15 or more, the probability of generation of commonly-used data other than bit9 and bit10 falls below the limit 10E-6, As the number N of states is increased, the acceptable range goes on becoming shorter. Furthermore, among the commonly-used data other than bit9 and bit10, particularly bit7 has low probability of generation. With reference to FIG. 10, it can be seen that bit7 represents data having a fixed pattern except in the initial stage. Hence, regarding the data having a fixed pattern, that regarding the data having a small degree of randomness, it can be seen that the probability of generation drastically decreases even with only a small shift in the periodicity.

In a PUP, data correction is generally performed using an error-correction code (ECC). In that case, if the probability of 15% is allowed as errors, then the number of bits in which two-bit errors are allowed in the abovementioned calculation is about 14 bits.

Figure 17:
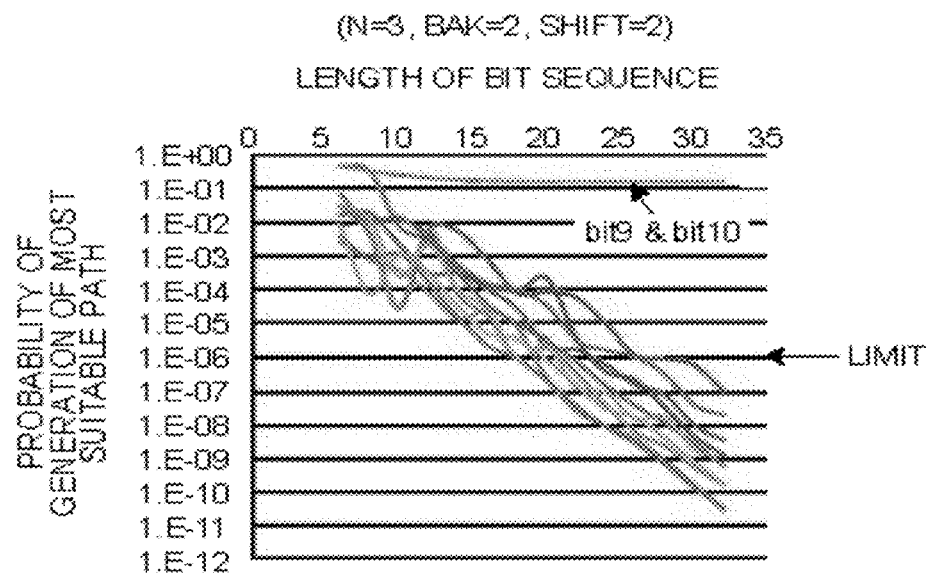
FIG. 17 is a diagram illustrating the effect of a shift in a case in which calculation is performed by inputting data illustrated in FIG. 1 (in the case of N=3)
Figure 18:
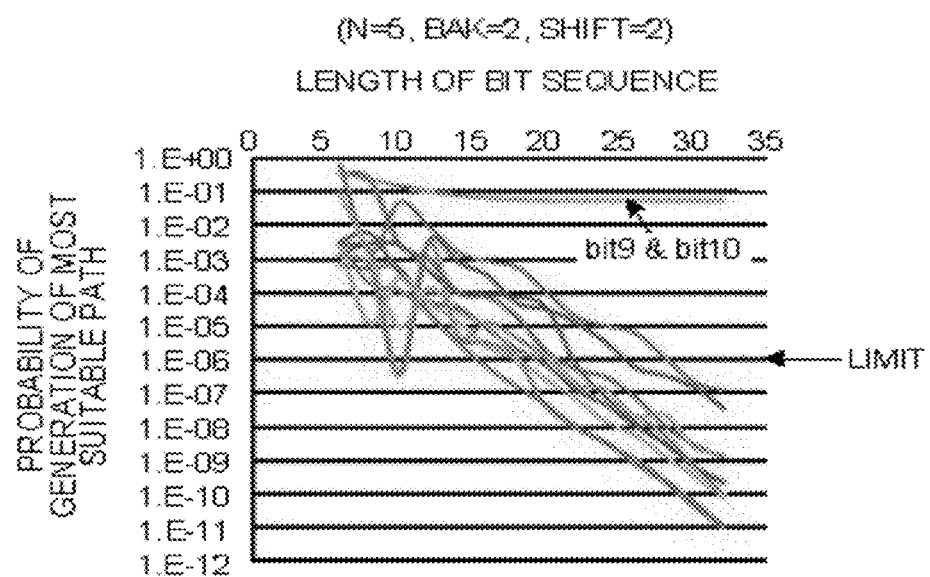
FIG. 18 is a diagram illustrating the effect of a shift in a case in which calculation is performed by inputting data illustrated in FIG. 1 (in the case of N=0.5)

FIGS. 17 and 18 are diagrams illustrating the effect of the shift in the case in which the calculation is performed by inputting data having a shift of two bits from the original data illustrated in FIG. 1. FIG. 17 illustrates a case in which the number N of states is three. FIG. 18 illustrates a case in which the number N of states is five. If FIGS. 17 and 18 are compared, it can be seen that the case in which the number N of states is three is less affected by the shift as compared to the case in which the number N of states is five. That is, if the number N of states is reduced, the decrease in the probability of generation in response to a shift can be held down. It implies that, in the abovementioned method according to the embodiment, if the number N of states is reduced, it becomes possible to obtain a stable result against a shift.

As illustrated in FIGS. 11 to 18, the following result is obtained.

(1) As the iteration count e algorithm increases, the difference in the probabilities of generation goes on increasing. That is, as the iteration count increases, the authentication probability in the case of no errors increases.

(2) Regarding a pattern in which bits are shifted, the authentication probability reaches the peak in a few iteration patterns, and moves closer to zero if the iteration count increases further. It implies that the iteration count of the BW algorithm is desirably set to the number at which the authentication probability reaches the peak.

(3) With respect to data patterns such as bit9 and bit10 in which fixed values are repeated, the authentication probability becomes zero even with the shift of a single bit. Hence, such data patterns need to be handled individually.

Based on the result, if the ID for authentication purposes is decided by taking into account the data-dependent nature, it becomes possible to perform authentication of higher accuracy.

Figure 19:
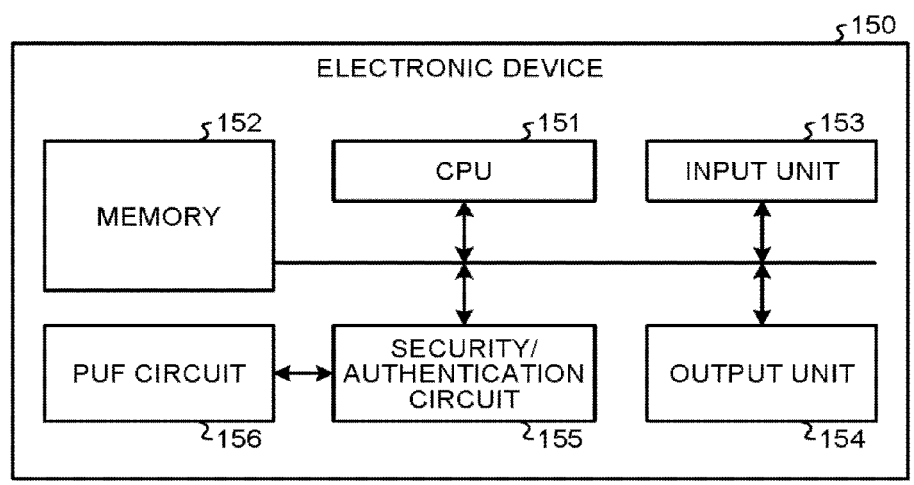
FIG. 19 is a diagram illustrating an exemplary overall configuration of a target electronic device for authentication according to the embodiment.

FIG. 19 illustrates an exemplary overall configuration of a target electronic device for authentication according to the embodiment. As illustrated in FIG. 19, an electronic device 150 includes a central processing unit (CPU) 151, a memory 152, an input unit 153, an output unit 154, a security/authentication circuit 155, and a PUF circuit 156. An input signal (a challenge) that serves as the trigger for starting the authentication is output as a command from the CPU 151 to the security/authentication circuit 155. Upon receiving the input signal (the challenge), the security/authentication circuit 155 accesses the PUP circuit 156 and obtains ID-related information from the PUF circuit 156. The ID-related information is retrieved on the server side via the output unit 154 (as a response) and the ID authentication is carried out by collating the ID-related information with the changes in the defect variability as estimated on the server side.

As described above, according to the embodiment, it becomes possible to implement an authentication system, an authentication device, and an authentication method that are effective even when there is correlation among the pieces of data.

Meanwhile, the random number source is not limited to the random number generating circuit illustrated in FIG. 6 or FIG. 7. Alternatively, the noise source of a commonly-used random number generating circuit can be implemented in a broad scope. In a commonly-used noise source, if the initial position of the operations is identified, the noise pattern exhibits a characteristic value in each element.

Figure 20:
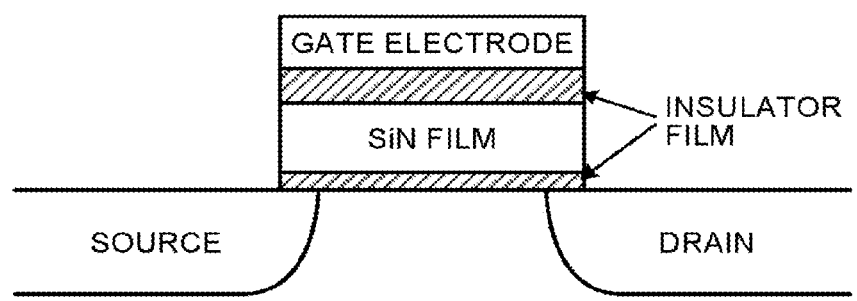
FIG. 20 is a diagram illustrating an exemplary noise source according to the embodiment in which transistor noise is used.
Figure 21:
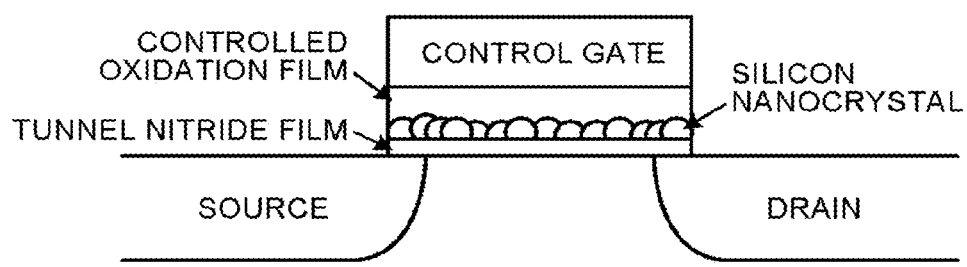
FIG. 21 is a diagram illustrating another exemplary noise source according to the embodiment in which transistor noise is used.

FIG. 20 illustrates a noise source in which the trap inside a silicon nitride film, which is disposed in a semiconductor having an oxide-nitride-oxide (ONO) structure, is used (M. Matsumoto et al,: Non-Stoichiometric SixN MOSFET for Compact Random Number Generator with 0.3 Mbit/sec Generation Rate: Jpn. J. Appl. Phys. 47 (2008) pp. 6191-6195). FIG. 21 illustrates a noise source in the case in which a gate insulator film, which is made of a tunnel nitride film and a controlled oxidation film, has a trap of silicon nanocrystals as the quantum dot (R. Ohba et al,: Narrow-channel-MOSFET having Si-dots for high-rate generation of random numbers: IEEE International Electron Devices Meeting (IEDM) 2003, Technical Digest p. 31.3 (2003), Washington D.C., USA: Dec. 9-10, 2003). The two noise sources illustrated in FIGS. 20 and 21 include a structure for increasing particularly the noise amplitude. However, the noise of a normal transistor can also be used as the noise source.

Figure 22:
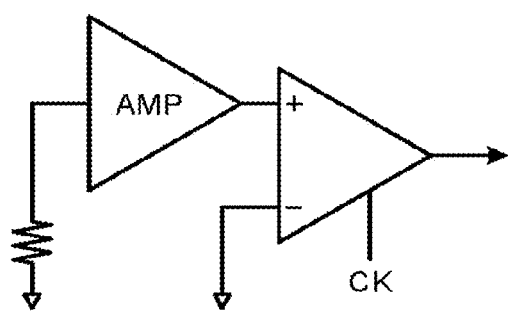
FIG. 22 is a diagram illustrating an exemplary circuit for amplifying transistor noise according to the embodiment.

FIG. 22 illustrates an exemplary circuit for amplifying the transistor noise. In the case of using a general-purpose transistor, the moment capturing the first change in the electrical current can be treated as the starting time, and the time pattern of the electrical current variation attributed to the trap from the starting time can be treated as the PUF pattern.

As another example, an element called a single electron device, in which the number of electrons can be counted, can also be used as the noise source (K. Uchida et al., T: Single-electron random-number generator (RNG) for highly secure ubiquitous computing applications: IEEE International Electron Devices Meeting 2002. Technical Digest p. 177 (2002), San Francisco, USA: Dec. 9-11, 2002.).

In this way, according to the embodiment, even in the case in which the ID generation method depends on the individual device, it becomes possible to build an authentication system, an authentication device, and an authentication method that are more robust in nature.

Meanwhile, in the embodiment described above, the explanation is given for an example of using the HMM. However, for example, if there is a deficit in some part of user data thereby leading to a situation in which collation of the registered data and the user data cannot be performed for the same number of pieces of data, it is also possible to implement a method called dynamic time warping (DTW) (initially, dynamic programming (DP)) matching.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An authentication system comprising:
    a physical device that includes a ring oscillator, which outputs a data sequence along a time series, a value of each bit of the data sequence being correlated with a value of another bit in the data sequence;
    a measurement unit that obtains a plurality of data sequences by performing measurements of the data sequence of the ring oscillator, the measurements of the data sequence of the ring oscillator being performed two or more times immediately after an activation of the ring oscillator when the ring oscillator is in an unstable state;
    a generator that generates an identification (ID) for the physical device from the plurality of data sequences using a statistical method;
    a calculator that, using a hidden Markov model, performs a probability calculation on the ID; and
    an authenticator that authenticates the physical device based on a calculation result of the calculator.

2. The system according to claim 1, further comprising a decider that, based on Baum-Welsh algorithm, decides a model parameter of the hidden Markov model for the ID.

3. The system according to claim 1, wherein, based on a Viterbi algorithm, the calculator performs the probability calculation on the ID.

4. The system according to claim 1, wherein the calculator obtains the data sequence of the ring oscillator via a network.

5. The system according to claim 1, further comprising an error corrector that performs error correction on the ID generated by the generator.

6. The system according to claim 1, wherein
    a number of bits of the data sequence of the ring oscillator is equal to or smaller than 15, and
    the ID is a bit sequence having a same number of bits as that of the data sequence of the ring oscillator.

7. The system according to claim 1, wherein the hidden Markov model used by the authenticator has a number of states equal to or smaller than five.

8. An authentication device using a physically unclonable function, the device comprising:
    a generator that, using a statistical method, generates an identification (ID) from a plurality of data sequences obtained by performing measurements of a data sequence being output from a ring oscillator, the measurements of the data sequence from the ring oscillator being repeated two or more times immediately after an activation of the ring oscillator, the ring oscillator outputting each data sequence along a time series when the ring oscillator is in an unstable state, and a value of each bit of each respective data sequence of the plurality of data sequences being correlated with a value of another bit of the respective data sequence; and an authenticator that, using hidden Markov model, performs probability calculation on the ID, and authenticates the physical device based on a result of the probability calculation.

9. An authentication method using a physically unclonable function, the method comprising:

generating, using a statistical method an identification (ID) from a plurality of data sequences obtained by performing measurements of a data sequence being output from a ring oscillator, the measurements of the data sequence from the ring oscillator being repeated two or more times immediately after an activation of the ring oscillator, the ring oscillator outputting the data sequence along a time series when the physical device is in an unstable state, a value of each bit of each of each respective data sequence of the plurality of data sequences being correlated with a value of another bit of the respective data sequence;

performing, using hidden Markov model, probability calculation on the ID; and authenticating the physical device based on a result of the probability calculation.

* * * * *